United States Patent
Liang et al.

(10) Patent No.: US 12,230,799 B1
(45) Date of Patent: Feb. 18, 2025

(54) CARBON NANOTUBE SODIOPHILIC METAL ANODE-FREE SODIUM METAL BATTERY ELECTRODE MATERIAL, PREPARATION METHOD THEREFOR AND APPLICATION THEREOF

(71) Applicant: KUNMING UNIVERSITY OF SCIENCE AND TECHNOLOGY, Kunming (CN)

(72) Inventors: Feng Liang, Kunming (CN); Pan Liu, Kunming (CN); Minjie Hou, Kunming (CN); Da Zhang, Kunming (CN); Bin Yang, Kunming (CN)

(73) Assignee: KUNMING UNIVERSITY OF SCIENCE AND TECHNOLOGY, Kunming (CN)

( * ) Notice: Subject to any disclaimer, the term of this patent is extended or adjusted under 35 U.S.C. 154(b) by 0 days.

(21) Appl. No.: 18/816,719

(22) Filed: Aug. 27, 2024

Related U.S. Application Data

(63) Continuation of application No. PCT/CN2024/092148, filed on May 10, 2024.

(51) Int. Cl.
*H01M 4/583* (2010.01)
*H01M 4/02* (2006.01)
(Continued)

(52) U.S. Cl.
CPC ......... *H01M 4/583* (2013.01); *H01M 4/0404* (2013.01); *H01M 4/0471* (2013.01);
(Continued)

(58) Field of Classification Search
CPC .. H01M 4/583; H01M 4/0404; H01M 4/0471; H01M 4/133; H01M 4/625;
(Continued)

(56) References Cited

U.S. PATENT DOCUMENTS

2015/0364750 A1* 12/2015 Maheshwari ......... H01M 4/587
252/506

FOREIGN PATENT DOCUMENTS

CN 110577208 * 12/2019
CN 112794310 * 5/2021

OTHER PUBLICATIONS

Naseh et al., "Fast and clean functionalization of carbon nanotubes by dielectric barrier discharge plasma in air compared to acid treatment," 2010, Carbon, 48, 1369-1379. (Year: 2010).*

(Continued)

*Primary Examiner* — Matthew W Van Oudenaren
(74) *Attorney, Agent, or Firm* — Daniel M. Cohn; Howard M. Cohn

(57) ABSTRACT

A method for preparing a carbon nanotube sodiophilic metal anode-free sodium metal battery electrode material is provided, and the method includes the following steps: the carbon nanotubes are modified by a dielectric barrier plasma device; the modified carbon nanotubes are mixed and stirred with a sodiophilic metal salt to obtain a precursor slurry; the precursor slurry is dried, placed in a tube furnace after drying, and heated by introducing a reducing gas to react, thereby obtaining a carbon nanotube sodiophilic metal anode-free sodium metal battery electrode material. The electrode material prepared by the method has a stable structure, excellent electrical conductivity, and excellent sodium affinity, and can be applied to anode-free sodium metal battery electrode materials. The entire preparation process is controllable, the synthesis cycle is short, and the operation is simple.

9 Claims, 5 Drawing Sheets

---

Modifying carbon nanotubes by dielectric barrier plasma equipment.

↓

Mixing and stirring the modified carbon nanotubes with a sodiophilic metal salt to obtain a precursor slurry.

↓

Drying the precursor slurry, placing the precursor slurry in a tube furnace after drying, and heating to react under a reducing gas, thereby obtaining a carbon nanotube sodiophilic metal sodium anode-free sodium metal battery electrode material.

(51) Int. Cl.
*H01M 4/04* (2006.01)
*H01M 10/054* (2010.01)
(52) U.S. Cl.
CPC .... *H01M 10/054* (2013.01); *H01M 2004/021* (2013.01); *H01M 2004/027* (2013.01)
(58) Field of Classification Search
CPC ......... H01M 10/054; H01M 2004/021; H01M 2004/027; H01M 2004/028
See application file for complete search history.

(56) References Cited

OTHER PUBLICATIONS

Ye et al., "A sodiophilic interphase-mediated, dendrite-free anode with ultrahigh specific capacity for sodium-metal batteries," 2019, Angew. Chem. Int. Ed., 58, 17054-17060. (Year: 2019).*

* cited by examiner

```
┌─────────────────────────────────────────────────────────────────────┐
│ Modifying carbon nanotubes by dielectric barrier plasma equipment.  │
└─────────────────────────────────────────────────────────────────────┘
                                    │
┌─────────────────────────────────────────────────────────────────────┐
│ Mixing and stirring the modified carbon nanotubes with a sodiophilic metal │
│ salt to obtain a precursor slurry.                                  │
└─────────────────────────────────────────────────────────────────────┘
                                    │
┌─────────────────────────────────────────────────────────────────────┐
│ Drying the precursor slurry, placing the precursor slurry in a tube furnace │
│ after drying, and heating to react under a reducing gas, thereby obtaining a │
│ carbon nanotube sodiophilic metal sodium anode-free sodium metal battery │
│ electrode material.                                                 │
└─────────────────────────────────────────────────────────────────────┘
```

FIG. 1

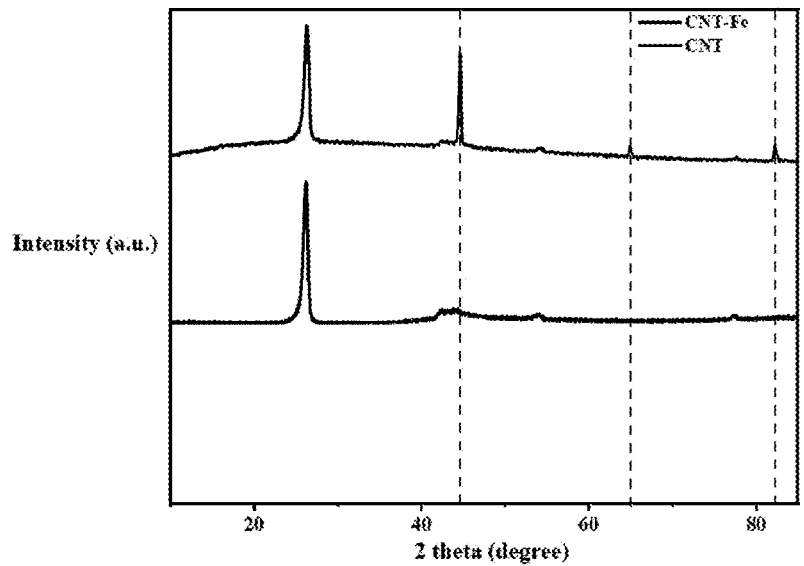

FIG. 2

CARBON NANOTUBE SODIOPHILIC METAL ANODE-FREE SODIUM METAL BATTERY ELECTRODE MATERIAL, PREPARATION METHOD THEREFOR AND APPLICATION THEREOF

CROSS-REFERENCE TO RELATED APPLICATIONS

This application is a continuation of International Patent Application No. PCT/CN2024/092148 filed on May 10, 2024, which is hereby incorporated by reference in its entirety.

TECHNICAL FIELD

The present invention relates to the field of sodium metal battery, in particular to carbon nanotube sodiophilic metal anode-free sodium metal battery electrode material, preparation method therefor and application thereof.

BACKGROUND

In the context of low-carbon energy, electrified transportation and intelligent equipment, the development of renewable energy not only provides a safe guarantee for the sustainable development of human energy, but also mitigates problems such as climate warming and environmental pollution. Sodium (Na) metal is considered to be the most likely anode electrode material to replace lithium metal due to its high theoretical capacity, abundant reserves and low cost. However, the energy density of sodium-ion batteries is typically less than 150 Wh kg$^{-1}$, which is only half of that of lithium-ion batteries of the same system. Using sodium as the anode is the most promising approach to improve the energy density of sodium-ion batteries because of its high theoretical capacity (1166 mAh g$^{-1}$) and low redox potential (−2.71 V vs. standard hydrogen electrode).

However, sodium metal is highly active, soft and sticky, which makes it difficult to process ultra-thin sodium metal anode electrodes. Currently, excessive amounts of ultra-thick sodium metal are often used as anode, which greatly reduces the actual energy density of the battery. The "anode-free" sodium metal battery (AFSMB) has the advantages of high energy density, low cost, and high safety. It is one of the most promising next-generation high-energy density battery systems. Nonetheless, the sodium source only comes from the cathode material, and problems such as irreversible loss of active sodium, unstable solid electrolyte interphase and short cycle life have seriously hindered its development.

SUMMARY

In view of the deficiencies in the prior art, one of the objectives of the present invention is to solve one or more problems in the above-mentioned prior art. For example, one of the objects of the present invention is to provide an anode-free sodium metal battery electrode material with long cycle life and high energy density.

In one aspect, the present invention provides method for preparing a carbon nanotube sodiophilic metal anode-free sodium metal battery electrode material, comprising the following steps:
Step 1, modifying the carbon nanotubes by using a dielectric barrier plasma device;
Step 2, mixing and stirring the modified carbon nanotubes with a sodiophilic metal salt to obtain a precursor slurry;
Step 3, drying the precursor slurry, placing the precursor slurry in a tubular furnace after drying, and heating to react under a reducing gas to obtain a carbon nanotube sodiophilic metal anode-free sodium metal battery electrode material.

Furthermore, the carbon nanotube sodiophilic metal anode-free sodium metal battery electrode material is a porous three-dimensional structure, and the porous three-dimensional structure includes a skeleton formed by the interweaving of the carbon nanotubes and the sodiophilic metal salt uniformly attached to the skeleton.

In some embodiments, in step 1, the modifying of the carbon nanotubes involves placing the carbon nanotubes in a dielectric barrier plasma discharge equipment mold and introducing an inert gas for activation. The inert gas is a combination of one or more of argon, nitrogen, and argon-hydrogen mixed gas.

In some embodiments, in step 2, magnetic stirring is used to obtain the precursor slurry, the speed of the magnetic stirring is 100 r/min~300 r/min, and the stirring time is 1 h~5 h. In step 3, vacuum drying is used, the vacuum drying time is 10 h~24 h, and the drying temperature is 40° C.~80° C., and the heating temperature of the heating reaction is increased to 200° C.~500° C. at a heating rate of 1° C./min~10° C./min, and then maintained at 200° C.~500° C. for 30 min~5 h until the reaction is completed.

In some embodiments, the sodiophilic metal salt is one or more combinations of ferric chloride, tin chloride, silver nitrate, magnesium acetate, and others. The mass ratio of the sodiophilic metal salt to the carbon nanotube ranges from (0-10):1.

In a second aspect, the present invention further provides a carbon nanotube sodiophilic metal anode-free sodium metal battery electrode material, which is prepared by the carbon nanotube sodiophilic metal anode-free sodium metal battery electrode material preparation method as described above.

In a third aspect, this invention further provides a method for preparing a composite electrode sheet for an anode-free sodium metal battery, comprising the following steps:
mixing the carbon nanotube sodiophilic metal anode-free sodium metal battery electrode material with a binder and a solvent to obtain a slurry;
coating the slurry on an anode current collector, and drying to obtain a composite electrode sheet, wherein the carbon nanotube sodiophilic metal anode-free sodium metal battery electrode material is prepared by the aforementioned carbon nanotube sodiophilic metal anode-free sodium metal battery electrode material preparation method, or the aforementioned carbon nanotube sodiophilic metal anode-free sodium metal battery electrode material. The coating thickness of the slurry on the anode current collector is 0.001 mm to 0.05 mm.

In a fourth aspect, the present invention further provides a composite sodium metal battery, comprising a cathode, an anode, a separator and an electrolyte, wherein the anode is a composite electrode sheet prepared by the method for preparing a composite electrode sheet for an anode-free sodium metal battery as described above.

Compared with the prior art, the beneficial effects of the present invention include at least one of the following:
(1) The electrode material prepared by the method of the present invention has a stable structure and excellent conductive properties, and can be applied to anode-free sodium metal battery electrode materials. The entire preparation process is controllable, the synthesis cycle is short, and the operation is simple.

(2) After the metal salt used in the present invention is reduced to metal, the Fe atomics have an affinity for sodium ions, inducing the deposition and dissolution of sodium during the battery charge and discharge process, thereby improving the conductivity and ion transfer rate of the electrode, improving the cycle stability and service life of the battery.

(3) The electrode material of the present invention has good chemical stability and electrochemical performance, excellent air stability, and high safety.

(4) The electrode material of the present invention uses multi-walled carbon nanotube (MWCNT) as a conductive network, has a high specific surface area, can make the electric field distribution uniform, delay dendrite growth, and has a light weight, which can improve the energy density of the sodium metal battery and extend its cycle life.

BRIEF DESCRIPTION OF THE DRAWINGS

In order to illustrate the technical solutions in the embodiments of the present application more clearly, the following will briefly introduce the drawings that are used in the embodiments. Apparently, the drawings in the following description are only some embodiments of the present application, and those skilled in the art can obtain other drawings according to these drawings without creative efforts.

FIG. 1 is a schematic flow diagram of steps of preparing a carbon nanotube sodiophilic metal anode-free sodium metal battery electrode material according to one embodiment of present invention.

FIG. 2 is the X-ray diffraction pattern (XRD) of the carbon nanotube sodiophilic metal anode-free sodium metal battery electrode material from a first embodiment of the present invention.

DETAILED DESCRIPTION OF THE EMBODIMENTS

Figure 3:
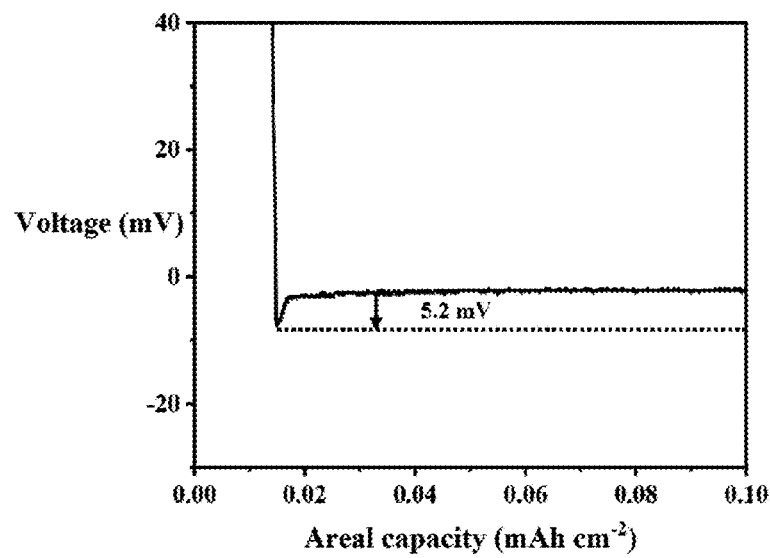
FIG. 3 is a voltage distribution diagram of a (Na/separator/anode) constant current sodium electroplating of the carbon nanotube sodiophilic metal anode-free sodium metal battery electrode material from a first embodiment of the present invention.

The present invention will be described in further detail below in conjunction with the accompanying drawings and specific embodiments, but the protection scope of the present invention is not limited to the content described. In the following examples, unless otherwise specified, all experimental methods are conventional operations, and the reagents used are commercially available.

One aspect of the present invention provides a method for preparing a carbon nanotube sodiophilic metal anode-free sodium metal battery electrode material, as shown in FIG. 1, which specifically comprises the following steps:

S1, modifying the carbon nanotubes through a dielectric barrier plasma device;

S2, mixing and stirring the modified carbon nanotubes with a sodiophilic metal salt to obtain a precursor slurry. Specifically, the modified carbon nanotubes, the sodiophilic metal salt and the solvent are stirred and mixed to obtain a precursor slurry;

S3, drying the precursor slurry, placing the precursor slurry in a tubular furnace after drying, and heating to react under reducing gas, so as to obtain a carbon nanotube sodiophilic metal anode-free sodium metal battery electrode material.

In some embodiments, carbon nanotubes (CNTs) are modified by a dielectric barrier plasma device to provide nucleation sites for sodiophilic metal salts. After the modified carbon nanotubes are mixed with sodiophilic metal salts, the modification treatment can provide active sites for the reduction of metal nucleation, allowing the metal to better composite with CNTs, enhancing the affinity of the anode for sodium ions and improving the electrochemical performance of the anode-free sodium metal battery. In certain embodiments, carbon nanotubes may be modified by an argon dielectric barrier plasma. For example, the power of the plasma equipment can be 100 W~400 W, and the processing time can be 1 min~30 min. That is, the power of the plasma equipment can be 100 W, 150 W, 200 W, 250 W, 300 W, 350 W, or 400 W, and the processing time can be 1 min, 2 min, 5 min, 8 min, 10 min, 15 min, 20 min, 25 min, or 30 min, as long as it is within the above range. Preferably, the power of the plasma equipment can be 300 W, and the processing time can be 5 min.

In some embodiments, the sodium affinity of the metal can be used to effectively induce uniform deposition of sodium ions after being combined with carbon nanotubes as a conductive network, thereby improving the energy density of the sodium metal battery and extending the cycle life of the sodium metal battery.

In some embodiments, the mass ratio of the sodiophilic metal salt to the CNTs can be (0-10):1. The value of the sodiophilic metal salt in the above mass ratio can be 0, or it can be 0.2, 0.5, 0.8, 1, 1.5, 2, 3, 5, 7, 9, or 10, as long as it is within the aforementioned range. For example, the mass ratio of the sodiophilic metal salt to the CNTs can be (0-9):1, (2-7):1, (4-6):1 or a combination of the above ranges. Preferably, the mass ratio of the sodiophilic metal salt to the CNTs may be 3:1. Under the above preferred ratio, the distribution of the sodiophilic metal is more uniform, the porosity is high, the specific surface area is large, the dealloying is easier, and it is more conducive to the uniform deposition of sodium metal.

In some embodiments, the sodiophilic metal salt can be one or more combinations of ferric chloride, tin chloride, silver nitrate, magnesium acetate, and the like.

In some embodiments, the above binder may be polyvinylidene fluoride, polyacrylic acid or polytetrafluoroethylene.

In some embodiments, the porous three-dimensional structure is composed of interwoven carbon nanotubes as a framework and sodiophilic metals are uniformly attached to the carbon nanotube walls. The interwoven carbon nanotubes serve as the basic skeleton of the electrode material, playing the role of a supporting network. In addition to stabilizing the structure of the electrode material, they can also reduce the local current density of the material. The sodiophilic metal is attached to the wall of the carbon nanotube. This structure allows for the even deposition of sodium ions, which delays the formation of dendrites, improves the cycle life of the battery, and effectively alleviates the problem of low coulombic efficiency of anode-free sodium metal batteries during cycling. The prepared material has high stability and excellent electrochemical performance. Carbon nanotubes have the characteristics of uniform current density distribution, uniform temperature field distribution, and uniform stress field distribution, which are more conducive to the anode-free sodium metal battery system.

In some embodiments, the carbon nanotubes may be multi-walled carbon nanotubes. Multi-walled carbon nanotubes can effectively conduct electrons, and the interlayer gaps of multi-walled carbon nanotubes can achieve rapid sodium ion transport, which can improve the reaction kinetics of electrode materials during cycling.

In some embodiments, heating the precursor material by introducing a reducing gas until the reaction is completed may include placing the precursor material in a vacuum tube furnace, heating the temperature to 200° C. to 500° C. at a heating rate of 1° C./min to 10° C./min, and then maintaining the temperature at 200° C. to 500° C. for 30 min to 2 h until the reaction is completed. That is, the heating rate can be 1° C./min, 2° C./min, 4° C./min, 5° C./min, 8° C./min, 10° C./min. The temperature can be increased to 200° C., 250° C., 300° C., 350° C., 400° C., 450° C., 500° C., the holding temperature can be 200° C., 250° C., 300° C., 350° C., 400° C., 450° C., 500° C., and the holding time can be 30 min, 35 min, 40 min, 50 min, 55 min, 1 h, 1.5 h, 2 h. As long as it is within the aforementioned range. For example, the temperature can be raised to 220° C.~350° C. at a heating rate of 3° C./min~7° C./min in a tubular furnace, and then maintained at 220° C.~350° C. for 30 min~60 min until the reaction is completed.

In some embodiments, the modified carbon nanotubes, the sodiophilic metal salt and the solvent are mixed and magnetically stirred to obtain a precursor solution. The speed of the magnetic stirring may be 100 r/min to 300 r/min. For example, the speed of the magnetic stirring may be 150 r/min, and the stirring time may be 5 h.

In some embodiments, drying can be vacuum drying. The vacuum drying time can be 8 h~24 h, and the drying temperature can be 40° C.~80° C. For example, the vacuum drying time may be 10 h to 15 h, and the drying temperature may be 50° C. to 70° C.

Another aspect of the present invention provides a carbon nanotube sodiophilic metal anode-free sodium metal battery electrode material, which is a composite material formed by a porous three-dimensional structure with interwoven carbon nanotubes as the skeleton and sodiophilic metals uniformly attached to the carbon nanotube walls, wherein the CNTs are modified by a dielectric barrier plasma device. The interwoven carbon nanotubes serve as the basic skeleton of the electrode material, playing the role of a supporting network. In addition to stabilizing the structure of the electrode material, they can also reduce the local current density of the material. Carbon nanotubes have the characteristics of uniform current density distribution, uniform temperature field distribution, and uniform stress field distribution, which are more conducive to the anode-free sodium metal battery system. The sodiophilic metal is attached to the wall of the carbon nanotube. The carbon nanotube and the sodiophilic metal are combined to construct an electrode material on which sodium ions can be evenly deposited, which delays the formation of dendrites, improves the cycle life of the battery, and effectively alleviates the problem of low coulombic efficiency of anode-free sodium metal batteries during cycling. The prepared material has high stability and excellent electrochemical performance.

Another aspect of the present invention provides a method for preparing a composite electrode sheet for an anode-free sodium metal battery, which may include the following steps:

The carbon nanotube sodiophilic metal anode-free sodium metal battery electrode material is mixed with an adhesive and a solvent to obtain a slurry. The slurry is coated on current collector and dried to obtain a composite electrode sheet. The mass ratio of the electrode material and the binder of the carbon nanotube sodiophilic metal anode-free sodium metal battery can be adjusted according to the actual battery setting requirements. For example, the mass ratio of the carbon nanotube sodiophilic metal anode-free sodium metal battery electrode material to the conductive agent can be 9:1, 7:3 or 9.5:0.5. After the carbon nanotube sodiophilic metal anode-free sodium metal battery electrode material is mixed with the binder, grinding can be performed to obtain a mixture. For example, the grinding time can be 20 min to 30 min.

In some embodiments, the anode current collector may be an existing anode current collector such as aluminum foil, copper foil, zinc foil, or iron foil.

In some embodiments, the slurry may be coated on the anode current collector to a thickness of 0.001 mm to 0.05 mm. Specifically, the slurry coating thickness may be 0.001 mm, 0.002 mm, 0.005 mm, 0.008 mm, 0.01 mm, 0.015 mm, 0.02 mm, 0.025 mm, 0.03 mm, 0.035 mm, 0.04 mm, 0.045 mm, or 0.05 mm, as long as it is within the aforementioned range. For example, the coating thickness may be 0.009 mm to 0.045 mm, 0.007 mm to 0.012 mm, 0.01 mm to 0.018 mm, or a combination of the above ranges.

Another aspect of the present invention provides a composite anode-free sodium metal battery, comprising a cathode, an anode, a separator and an electrolyte, wherein the anode is a composite electrode sheet prepared by the method for preparing a composite electrode sheet for an anode-free sodium metal battery as described above, the cathode and the anode are located on both sides of the separator, and the cathode can be a sodium metal sheet. The diameter of the sodium metal sheet can be 16 mm and the thickness can be 0.1 mm to 0.5 mm. Of course, the diameter and thickness of the cathode material of the present invention are not limited thereto and can be adjusted according to the actual needs of the battery.

In some embodiments, the electrolyte may be a sodium hexafluorophosphide/sodium tetrafluoroborate/diethylene glycol dimethyl ether solution. The separator may be a polypropylene film. Of course, it should be understood that the electrolyte and separator of the composite sodium metal battery of the present invention are not limited thereto.

First Embodiment

Step (1), MWCNT (multi-walled carbon nanotube) powder is placed in a dielectric barrier plasma mold, nitrogen gas is introduced, the voltage is adjusted to 150 V/200 V, the current is 2 A/1.5 A, and the treatment is ensured to be carried out at a power of 300 watts for 5 minutes to obtain the treated MWCNT.

Step (2), add sodiophilic metal salt $FeCl_3$ and MWCNT in a mass ratio of 3:1 into a beaker, add 10 mL of N,N-Dimethylformamide, and place it on a magnetic stirrer for 5 h to ensure that $FeCl_3$ and MWCNT are fully mixed.

Step (3), the precursor slurry is placed in a vacuum drying oven at 80° C. for 8 h. After drying, it is placed in a tubular furnace and heated to 350° C. at a heating rate of 5° C./min, then kept warm for 3 h, and a reducing gas is introduced to heat until the reaction is completed. The tube furnace is cooled to room temperature, and then the powder is taken out to obtain the target product MWCNT-Fe anode-free sodium metal battery electrode material.

The MWCNT-Fe anode-free sodium metal battery electrode material is mixed with polyvinylidene fluoride in a mass ratio of 9:1, added with 1-methyl-2-pyrrolidone solvent and ground for 20 min, then coated on copper foil, dried in vacuum at 120° C., and cut into pieces to prepare anode sheets. A composite button cell is assembled using a sodium metal sheet as the cathode, 1 M $NaPF_6$ dissolved in ethylene glycol dimethyl ether as the electrolyte, and a polypropylene film as the separator (PP film).

Figure 4:
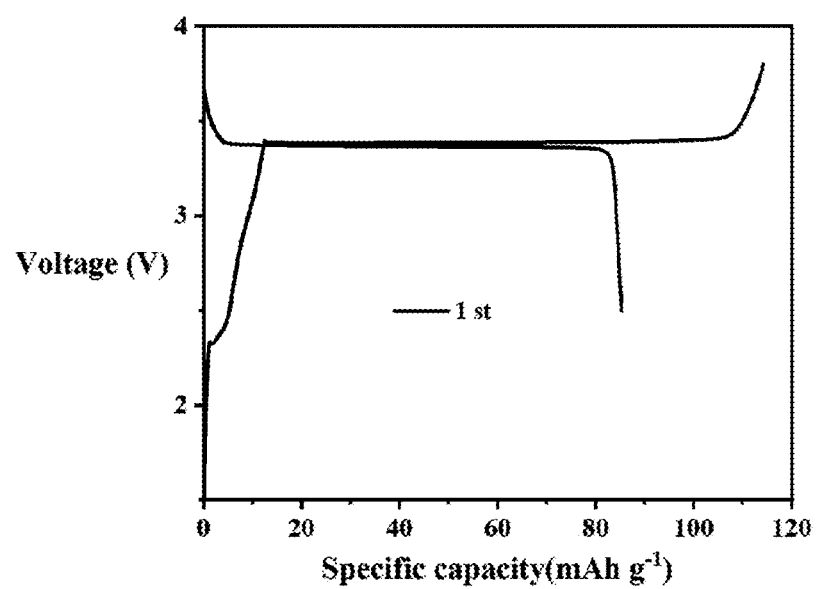
FIG. 4 is a graph showing the first charge and discharge curves (sodium vanadium phosphate/separator/anode) of the carbon nanotube sodiophilic metal anode-free sodium metal battery electrode material from a first embodiment of the present invention.

The X-ray diffraction (XRD) diagram of the composite electrode material obtained in the embodiment is shown in FIG. 2. The XRD diffraction peak corresponds to the characteristic peak, and after composited with Fe, only the diffraction peak is superimposed without the appearance of impurity peaks. FIG. 3 is a voltage distribution diagram of constant current sodium electroplating (Na/separator/anode) of the carbon nanotube sodiophilic metal anode-free sodium metal battery electrode material obtained in first embodiment of the present invention. It can be seen that the electrode material has a low nucleation overpotential, and sodium is easily deposited on the surface of the electrode sheet after the surface is composited with the sodiophilic metal. FIG. 4 is the first charge and discharge curve of the composite electrode material battery (NVP/separator/anode) obtained in this example. It can be seen from the figure that the first discharge capacity is as high as 87.9 mAh $g^{-1}$.

Second Embodiment

Step (1), MWCNT (multi-walled carbon nanotube) powder is placed in a dielectric barrier plasma mold, nitrogen gas is introduced, the voltage is adjusted to 150 V/200 V, the current is 2 A/1.5 A, and the treatment is ensured to be carried out at a power of 300 watts for 5 minutes to obtain the treated MWCNT.

Step (2), add sodiophilic metal salt $FeCl_3$ and MWCNT in a mass ratio of 4:1 into a beaker, add 10 mL of N,N-Dimethylformamide, and place it on a magnetic stirrer for 5 h to ensure that $FeCl_3$ and MWCNT are fully mixed.

Step (3), the precursor slurry is placed in a vacuum drying oven at 80° C. for 8 h. After drying, it is placed in a tubular furnace and heated to 350° C. at a heating rate of 5° C./min, then kept warm for 3 h, and a reducing gas is introduced to heat until the reaction is completed. The tube furnace is cooled to room temperature, and then the powder is taken out to obtain the target product MWCNT-Fe anode-free sodium metal battery electrode material.

The MWCNT-Fe anode-free sodium metal battery electrode material is mixed with polyvinylidene fluoride in a mass ratio of 9:1, added with 1-methyl-2-pyrrolidone solvent and ground for 20 min, then coated on copper foil, dried in vacuum at 120° C., and cut into pieces to prepare anode sheets. A composite button cell is assembled using a sodium metal sheet as the cathode, 1 M $NaPF_6$ dissolved in ethylene glycol dimethyl ether as the electrolyte, and a polypropylene film as the separator (PP film).

Figure 5:
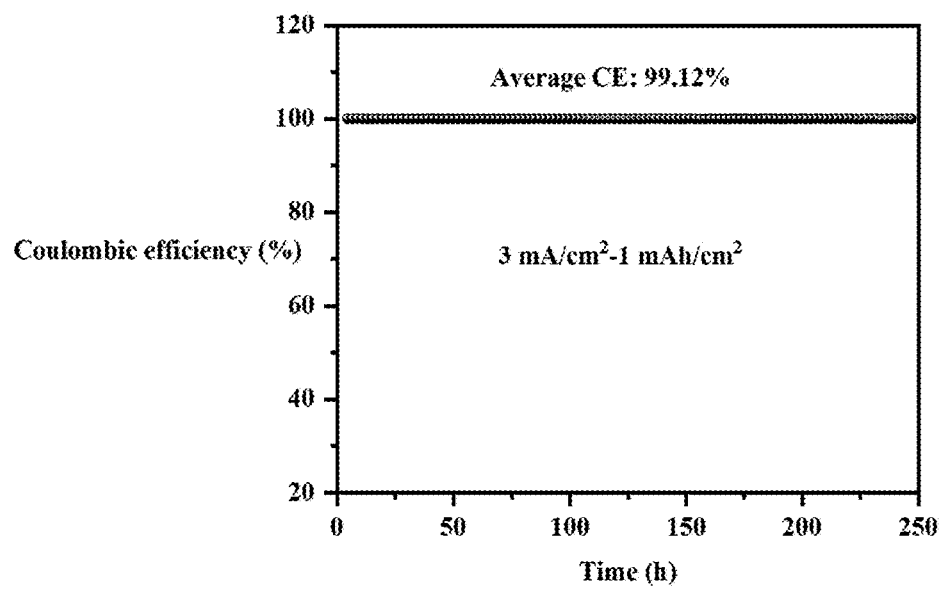
FIG. 5 is a half-cell (Na/separator/anode) cycle diagram of the carbon nanotube sodiophilic metal anode-free sodium metal battery electrode material from a second embodiment of the present invention.

The cycle performance of the battery assembled with the composite electrode material obtained in this example at a current density of 3 mA $cm^{-2}$ in the voltage range of 0 V to 3 V is shown in FIG. 5. The SEI is generated by 5 cycles at a low current density of 0.1 mA $cm^{-2}$ in advance, and the coulombic efficiency is close to 100% after 250 h of cycling.

Third Embodiment

Step (1), MWCNT (multi-walled carbon nanotube) powder is placed in a dielectric barrier plasma mold, nitrogen gas is introduced, the voltage is adjusted to 150 V/200 V, the current is 2 A/1.5 A, and the treatment is ensured to be carried out at a power of 300 watts for 5 minutes to obtain the treated MWCNT.

Step (2), add sodiophilic metal salt $FeCl_3$ and MWCNT in a mass ratio of 5:1 into a beaker, add 10 mL of N,N-Dimethylformamide, and place it on a magnetic stirrer for 5 h to ensure that $FeCl_3$ and MWCNT are fully mixed.

Step (3), the precursor slurry is placed in a vacuum drying oven at 80° C. for 8 h. After drying, it is placed in a tubular furnace and heated to 350° C. at a heating rate of 5° C./min, then kept warm for 3 h, and a reducing gas is introduced to heat until the reaction is completed. The tube furnace is cooled to room temperature, and then the powder is taken out to obtain the target product MWCNT-Fe anode-free sodium metal battery electrode material.

The MWCNT-Fe anode-free sodium metal battery electrode material is mixed with polyvinylidene fluoride in a mass ratio of 9:1, added with 1-methyl-2-pyrrolidone solvent and ground for 20 min, then coated on copper foil, dried in vacuum at 120° C., and cut into pieces to prepare anode sheets. A composite button cell is assembled using a sodium metal sheet as the cathode, 1 M $NaPF_6$ dissolved in ethylene glycol dimethyl ether as the electrolyte, and a polypropylene film as the separator (PP film).

Figure 6:
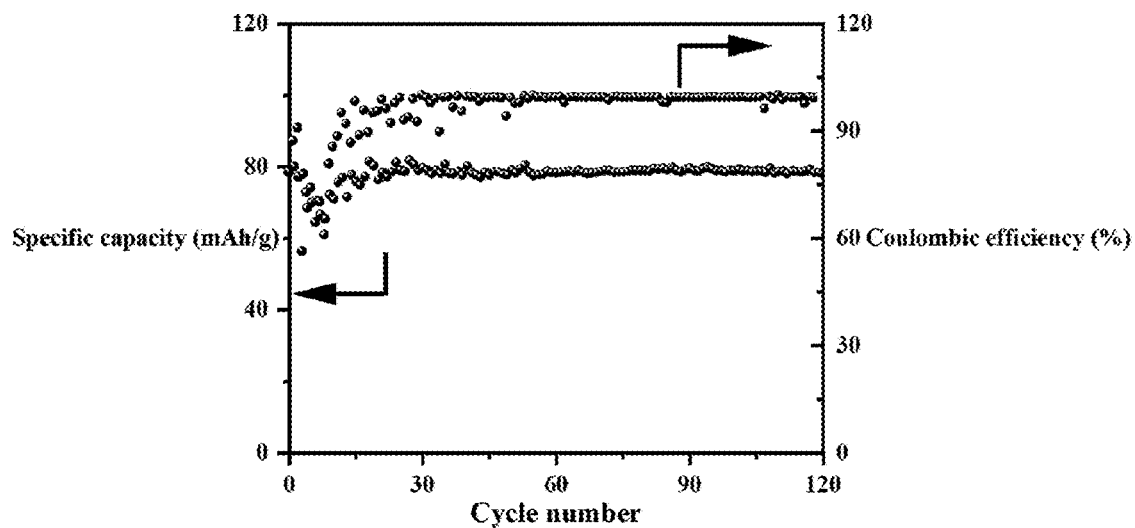
FIG. 6 is a graph showing the first charge and discharge curves (sodium vanadium phosphate/separator/anode) of the carbon nanotube sodiophilic metal anode-free sodium metal battery electrode material from a third embodiment of the present invention.

The battery assembled with the composite electrode material obtained in this embodiment has a cycle performance in the voltage range of 2.5 V to 3.8 V at a current density of 117.6 mAh $g^{-1}$ as shown in FIG. 6. The initial discharge capacity is 85.4 mAh $g^{-1}$, and after 120 cycles, the coulombic efficiency is as high as 95.4%.

Fourth Embodiment

Step (1), MWCNT (multi-walled carbon nanotube) powder is placed in a dielectric barrier plasma mold, nitrogen gas is introduced, the voltage is adjusted to 150 V/200 V, the current is 2 A/1.5 A, and the treatment is ensured to be carried out at a power of 300 watts for 5 minutes to obtain the treated MWCNT.

Step (2), add sodiophilic metal salt $FeCl_3$ and MWCNT in a mass ratio of 6:1 into a beaker, add 10 mL of N,N-Dimethylformamide, and place it on a magnetic stirrer for 5 h to ensure that $FeCl_3$ and MWCNT are fully mixed.

Step (3), the precursor slurry is placed in a vacuum drying oven at 80° C. for 8 h. After drying, it is placed in a tubular furnace and heated to 350° C. at a heating rate of 5° C./min, then kept warm for 3 h, and a reducing gas is introduced to heat until the reaction is completed. The tube furnace is cooled to room temperature, and then the powder is taken out to obtain the target product MWCNT-Fe anode-free sodium metal battery electrode material.

The MWCNT-Fe anode-free sodium metal battery electrode material is mixed with polyvinylidene fluoride in a mass ratio of 9:1, added with 1-methyl-2-pyrrolidone solvent and ground for 20 min, then coated on copper foil, dried in vacuum at 120° C., and cut into pieces to prepare anode sheets. A composite button cell is assembled using a sodium metal sheet as the cathode, 1 M $NaPF_6$ dissolved in ethylene glycol dimethyl ether as the electrolyte, and a polypropylene film as the separator (PP film).

Figure 7:
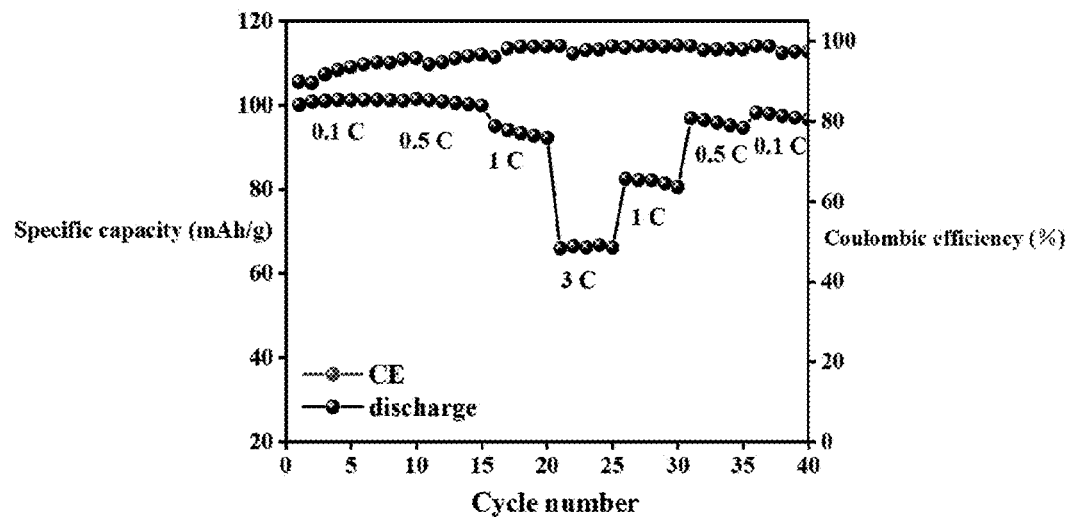
FIG. 7 is a half-cell (Na/separator/anode) rate performance diagram of the carbon nanotube sodiophilic metal anode-free sodium metal battery electrode material from a fourth embodiment of the present invention.

The cycle performance of the battery assembled with the composite electrode material obtained in this example at different current densities within the voltage range of 0 V to 2.5 V is shown in FIG. 7. When the current density reaches 352.8 mAh $g^{-1}$, the coulombic efficiency is still higher than 90%.

Fifth Embodiment

Step (1), MWCNT (multi-walled carbon nanotube) powder is placed in a dielectric barrier plasma mold, nitrogen gas is introduced, the voltage is adjusted to 150 V/200 V, the current is 2 A/1.5 A, and the treatment is ensured to be carried out at a power of 300 watts for 5 minutes to obtain the treated MWCNT.

Step (2), add sodiophilic metal salt $FeCl_3$ and MWCNT in a mass ratio of 7:1 into a beaker, add 10 mL of N,N-Dimethylformamide, and place it on a magnetic stirrer for 5 h to ensure that $FeCl_3$ and MWCNT are fully mixed.

Step (3), the precursor slurry is placed in a vacuum drying oven at 80° C. for 8 h. After drying, it is placed in a tubular furnace and heated to 350° C. at a heating rate of 5° C./min, then kept warm for 3 h, and a reducing gas is introduced to heat until the reaction is completed. The tube furnace is cooled to room temperature, and then the powder is taken out to obtain the target product MWCNT-Fe anode-free sodium metal battery electrode material.

The MWCNT-Fe anode-free sodium metal battery electrode material is mixed with polyvinylidene fluoride in a mass ratio of 9:1, added with 1-methyl-2-pyrrolidone solvent and ground for 20 min, then coated on copper foil, dried in vacuum at 120° C., and cut into pieces to prepare anode sheets. A composite button cell is assembled using a sodium metal sheet as the cathode, 1 M $NaPF_6$ dissolved in ethylene glycol dimethyl ether as the electrolyte, and a polypropylene film as the separator (PP film).

Figure 8:
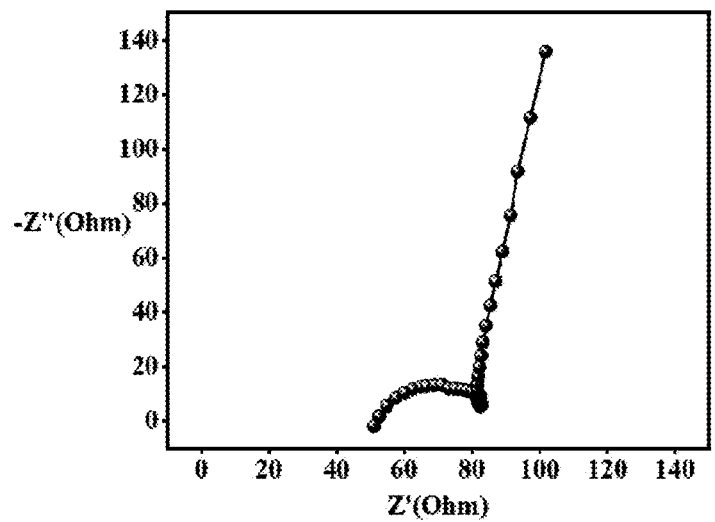
FIG. 8 is an electrochemical impedance spectroscopy (EIS) of the carbon nanotube sodiophilic metal anode-free sodium metal battery electrode material from a fifth embodiment of the present invention.

The AC impedance test of the battery assembled with the composite electrode material obtained in this example is shown in FIG. 8. It can be seen that there is a low impedance between the electrolyte material and the electrode material, indicating that the composite electrode material has excellent interface dynamics.

Sixth Embodiment

Step (1), MWCNT (multi-walled carbon nanotube) powder is placed in a dielectric barrier plasma mold, nitrogen gas is introduced, the voltage is adjusted to 150 V/200 V, the current is 2 A/1.5 A, and the treatment is ensured to be carried out at a power of 300 watts for 5 minutes to obtain the treated MWCNT.

Step (2), add sodiophilic metal salt $FeCl_3$ and MWCNT in a mass ratio of 8:1 into a beaker, add 10 mL of N,N-Dimethylformamide, and place it on a magnetic stirrer for 5 h to ensure that $FeCl_3$ and MWCNT are fully mixed.

Step (3), the precursor slurry is placed in a vacuum drying oven at 80° C. for 8 h. After drying, it is placed in a tubular furnace and heated to 350° C. at a heating rate of 5° C./min, then kept warm for 3 h, and a reducing gas is introduced to heat until the reaction is completed. The tube furnace is cooled to room temperature, and then the powder is taken out to obtain the target product MWCNT-Fe anode-free sodium metal battery electrode material.

The MWCNT-Fe anode-free sodium metal battery electrode material is mixed with polyvinylidene fluoride in a mass ratio of 9:1, added with 1-methyl-2-pyrrolidone solvent and ground for 20 min, then coated on copper foil, dried in vacuum at 120° C., and cut into pieces to prepare anode sheets. A composite button cell is assembled using a sodium metal sheet as the cathode, 1 M $NaPF_6$ dissolved in ethylene glycol dimethyl ether as the electrolyte, and a polypropylene film as the separator (PP film).

The battery assembled with the composite electrode material obtained in this embodiment has stable electrochemical performance and long cycle life in the voltage range of 2.5 V to 3.8 V.

Seventh Embodiment

Step (1), MWCNT (multi-walled carbon nanotube) powder is placed in a dielectric barrier plasma mold, nitrogen gas is introduced, the voltage is adjusted to 150 V/200 V, the current is 2 A/1.5 A, and the treatment is ensured to be carried out at a power of 300 watts for 5 minutes to obtain the treated MWCNT.

Step (2), add sodiophilic metal salt $FeCl_3$ and MWCNT in a mass ratio of 9:1 into a beaker, add 10 mL of N,N-Dimethylformamide, and place it on a magnetic stirrer for 5 h to ensure that $FeCl_3$ and MWCNT are fully mixed.

Step (3), the precursor slurry is placed in a vacuum drying oven at 80° C. for 8 h. After drying, it is placed in a tubular furnace and heated to 350° C. at a heating rate of 5° C./min, then kept warm for 3 h, and a reducing gas is introduced to heat until the reaction is completed. The tube furnace is cooled to room temperature, and then the powder is taken out to obtain the target product MWCNT-Fe anode-free sodium metal battery electrode material.

The MWCNT-Fe anode-free sodium metal battery electrode material is mixed with polyvinylidene fluoride in a mass ratio of 9:1, added with 1-methyl-2-pyrrolidone solvent and ground for 20 min, then coated on copper foil, dried in vacuum at 120° C., and cut into pieces to prepare anode sheets. A composite button cell is assembled using a sodium metal sheet as the cathode, 1 M $NaPF_6$ dissolved in ethylene glycol dimethyl ether as the electrolyte, and a polypropylene film as the separator (PP film).

The battery assembled with the composite electrode material obtained in this embodiment has stable electrochemical performance and long cycle life in the voltage range of 2.5 V to 3.8 V.

Eighth Embodiment

Step (1), MWCNT (multi-walled carbon nanotube) powder is placed in a dielectric barrier plasma mold, nitrogen gas is introduced, the voltage is adjusted to 150 V/200 V, the current is 2 A/1.5 A, and the treatment is ensured to be carried out at a power of 300 watts for 5 minutes to obtain the treated MWCNT.

Step (2), add sodiophilic metal salt $FeCl_3$ and MWCNT in a mass ratio of 10:1 into a beaker, add 10 mL of N,N-Dimethylformamide, and place it on a magnetic stirrer for 5 h to ensure that $FeCl_3$ and MWCNT are fully mixed.

Step (3), the precursor slurry is placed in a vacuum drying oven at 80° C. for 8 h. After drying, it is placed in a tubular furnace and heated to 350° C. at a heating rate of 5° C./min, then kept warm for 3 h, and a reducing gas is introduced to heat until the reaction is completed. The tube furnace is cooled to room temperature, and then the powder is taken out to obtain the target product MWCNT-Fe anode-free sodium metal battery electrode material.

The MWCNT-Fe anode-free sodium metal battery electrode material is mixed with polyvinylidene fluoride in a mass ratio of 9:1, added with 1-methyl-2-pyrrolidone solvent and ground for 20 min, then coated on copper foil, dried in vacuum at 120° C., and cut into pieces to prepare anode sheets. A composite button cell is assembled using a sodium metal sheet as the cathode, 1 M $NaPF_6$ dissolved in ethylene glycol dimethyl ether as the electrolyte, and a polypropylene film as the separator (PP film).

The battery assembled with the composite electrode material obtained in this embodiment has stable electrochemical performance and long cycle life in the voltage range of 2.5 V to 3.8 V.

Ninth Embodiment

Step (1), MWCNT (multi-walled carbon nanotube) powder is placed in a dielectric barrier plasma mold, nitrogen gas is introduced, the voltage is adjusted to 100 V, the current is 2 A, and the treatment is ensured to be carried out at a power of 300 watts for 5 minutes to obtain the treated MWCNT.

Step (2), add sodiophilic metal salt $FeCl_3$ and MWCNT in a mass ratio of 3:1 into a beaker, add 10 mL of N,N-Dimethylformamide, and place it on a magnetic stirrer for 5 h to ensure that $FeCl_3$ and MWCNT are fully mixed.

Step (3), the precursor slurry is placed in a vacuum drying oven at 80° C. for 8 h. After drying, it is placed in a tubular furnace and heated to 350° C. at a heating rate of 5° C./min, then kept warm for 3 h, and a reducing gas is introduced to heat until the reaction is completed. The tube furnace is cooled to room temperature, and then the powder is taken out to obtain the target product MWCNT-Fe anode-free sodium metal battery electrode material.

The MWCNT-Fe anode-free sodium metal battery electrode material is mixed with polyvinylidene fluoride in a mass ratio of 9:1, added with 1-methyl-2-pyrrolidone solvent and ground for 20 min, then coated on copper foil, dried in vacuum at 120° C., and cut into pieces to prepare anode sheets. A composite button cell is assembled using a sodium metal sheet as the cathode, 1 M $NaPF_6$ dissolved in ethylene glycol dimethyl ether as the electrolyte, and a polypropylene film as the separator (PP film).

The battery assembled with the composite electrode material obtained in this embodiment has stable electrochemical performance and long cycle life in the voltage range of 2.5 V to 3.8 V.

Tenth Embodiment

Step (1), MWCNT (multi-walled carbon nanotube) powder is placed in a dielectric barrier plasma mold, nitrogen gas is introduced, the voltage is adjusted to 70 V, the current is 4 A, and the treatment is ensured to be carried out at a power of 280 watts for 5 minutes to obtain the treated MWCNT.

Step (2), add sodiophilic metal salt $FeCl_3$ and MWCNT in a mass ratio of 3:1 into a beaker, add 10 mL of N,N-Dimethylformamide, and place it on a magnetic stirrer for 5 h to ensure that $FeCl_3$ and MWCNT are fully mixed.

Step (3), the precursor slurry is placed in a vacuum drying oven at 80° C. for 8 h. After drying, it is placed in a tubular furnace and heated to 350° C. at a heating rate of 5° C./min, then kept warm for 3 h, and a reducing gas is introduced to heat until the reaction is completed. The tube furnace is cooled to room temperature, and then the powder is taken out to obtain the target product MWCNT-Fe anode-free sodium metal battery electrode material.

The MWCNT-Fe anode-free sodium metal battery electrode material is mixed with polyvinylidene fluoride in a mass ratio of 9:1, added with 1-methyl-2-pyrrolidone solvent and ground for 20 min, then coated on copper foil, dried in vacuum at 120° C., and cut into pieces to prepare anode sheets. A composite button cell is assembled using a sodium metal sheet as the cathode, 1 M $NaPF_6$ dissolved in ethylene glycol dimethyl ether as the electrolyte, and a polypropylene film as the separator (PP film).

The battery assembled with the composite electrode material obtained in this embodiment has stable electrochemical performance and long cycle life in the voltage range of 2.5 V to 3.8 V.

The First Comparative Example

Figure 9:
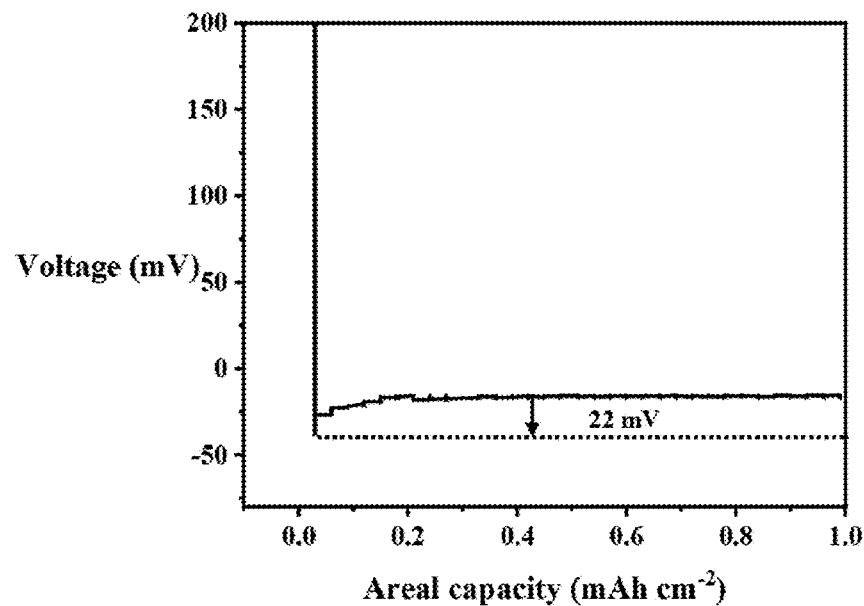
FIG. 9 is a voltage distribution diagram of a (Na/separator/anode) constant current sodium electroplating of the carbon nanotube sodiophilic metal anode-free sodium metal battery electrode material from a first comparative embodiment of the present invention.

Compared with first embodiment, the difference between the first comparative example is that the mass ratio of MWCNT and sodiophilic metal salt $FeCl_3$ is 1:0, and the other preparation methods are the same. The voltage distribution of constant current sodium electroplating of the battery assembled with the composite electrode material obtained in the first comparative example is shown in FIG. 9. The nucleation overpotential is as high as 22 mV, indicating that the nucleation barrier for the deposition of sodium ions on the electrode sheet is relatively large. The reason for this is that the carbon nanotubes have a large specific surface area and low ion conductivity because they do not contain sodiophilic metals. Active sodium ions are prone to side reactions with the electrolyte. Therefore, sodiophilic metals need to be added to improve the electrochemical performance of the battery.

The Second Comparative Example

Figure 10:
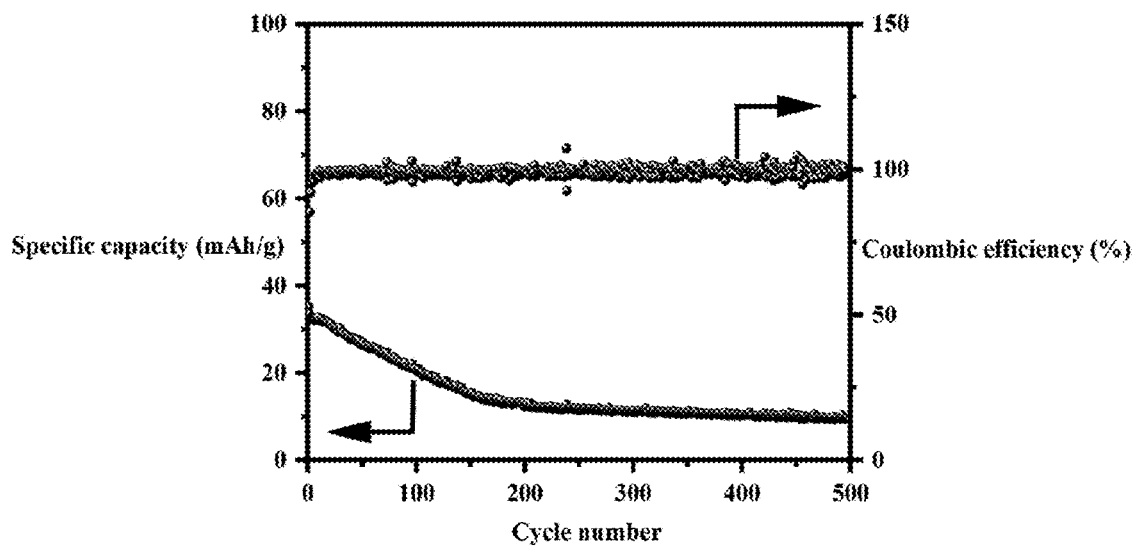
FIG. 10 is a graph showing the first charge and discharge curves (sodium vanadium phosphate/separator/anode) of the carbon nanotube sodiophilic metal anode-free sodium metal battery electrode material from a second comparative embodiment of the present invention.

Compared with the first embodiment, the difference in second comparative example is that the MWCNT is not treated with a dielectric barrier plasma device, and the other preparation methods are the same. The battery assembled with the composite electrode material obtained in the second comparative example cycles at 2.5 V to 3.8 V as shown in FIG. 10. After 200 cycles, the capacity drops to 17.3 mAh $g^{-1}$. The reason for this is that the carbon nanotubes have not been treated with dielectric barrier plasma equipment, the metal nucleation distribution is uneven, and they are easy to aggregate, resulting in a greater reaction with active sodium ions, uneven deposition, and large aggregation stress, which is prone to cracking. Therefore, it is necessary to perform dielectric barrier plasma treatment on CNTs to improve the electrochemical performance of the battery.

What is claimed is:

1. A method for preparing carbon nanotube sodiophilic metal anode-free sodium metal battery electrode material, comprising:
   modifying carbon nanotubes by dielectric barrier plasma equipment to obtain modified carbon nanotubes;
   mixing and stirring the modified carbon nanotubes with a sodiophilic metal salt to obtain a precursor slurry;
   drying the precursor slurry, placing the precursor slurry in a tube furnace after drying, and heating to react under a reducing gas, thereby obtaining a carbon nanotube sodiophilic metal anode-free sodium metal battery electrode material.

2. The method according to claim 1, wherein the carbon nanotube sodiophilic metal anode-free sodium metal battery electrode material has a porous three-dimensional structure, and the porous three-dimensional structure includes a skeleton formed by interweaving carbon nanotubes and a sodiophilic metal salt uniformly attached to the skeleton.

3. The method according to claim 1, wherein the modifying carbon nanotubes includes placing the carbon nanotubes in a dielectric barrier plasma discharge equipment mold and introducing an inert gas for activation treatment, with the inert gas being one or more combinations of argon, nitrogen, and argon-hydrogen mixed gas.

4. The method according to claim 1, wherein in the stirring modified carbon nanotubes with sodiophilic metal salt, magnetic stirring is used, a speed of magnetic stirring is in a range of 100 r/min-300 r/min, and a stirring time is in a range of 1 h-5 h; and in the drying precursor slurry, vacuum drying is used, a vacuum drying time is in a range of 10 h-24 h, and a drying temperature is in a range of 40° C.-80' C.

5. The method according to claim 1, wherein in the heating to react under reducing gas, a heating temperature is increased to a temperature in a range of 200° C.-500° C. at a heating rate in a range of 1° C./min-10° C./min, and then maintained at 200° C. to 500° C. for 30 min to 5 h until a reaction under reducing gas is completed.

6. The method according to claim 1, wherein the sodiophilic metal salt is one or more combinations of ferric chloride, tin chloride, silver nitrate and magnesium acetate, and a mass ratio of the sodiophilic metal salt to the carbon nanotubes is (0-10): 1, wherein 0 is not included.

7. A carbon nanotube sodiophilic metal anode-free sodium metal battery electrode material, wherein the carbon nanotube sodiophilic metal anode-free sodium metal battery electrode material is prepared by the method for preparing the carbon nanotube sodiophilic metal anode-free sodium metal battery electrode material as claimed in claim 1.

8. A method for preparing a composite electrode sheet for an anode-free sodium metal battery, comprising:
   mixing carbon nanotube sodiophilic metal anode-free sodium metal battery electrode material with a binder and a solvent to obtain a slurry;
   coating the slurry on an anode current collector, and drying to obtain a composite electrode sheet,
   wherein the carbon nanotube sodiophilic metal anode-free sodium metal battery electrode material is prepared by the carbon nanotube sodiophilic metal anode-free sodium metal battery electrode material preparation method as claimed in claim 1.

9. The method according to claim 8, wherein a coating thickness of the slurry on the anode current collector is in a range of 0.001 mm-0.05 mm.

\* \* \* \* \*